No. 865,682. PATENTED SEPT. 10, 1907.
H. CRAMER.
WHEEL.
APPLICATION FILED FEB. 13, 1906. RENEWED MAY 21, 1907.
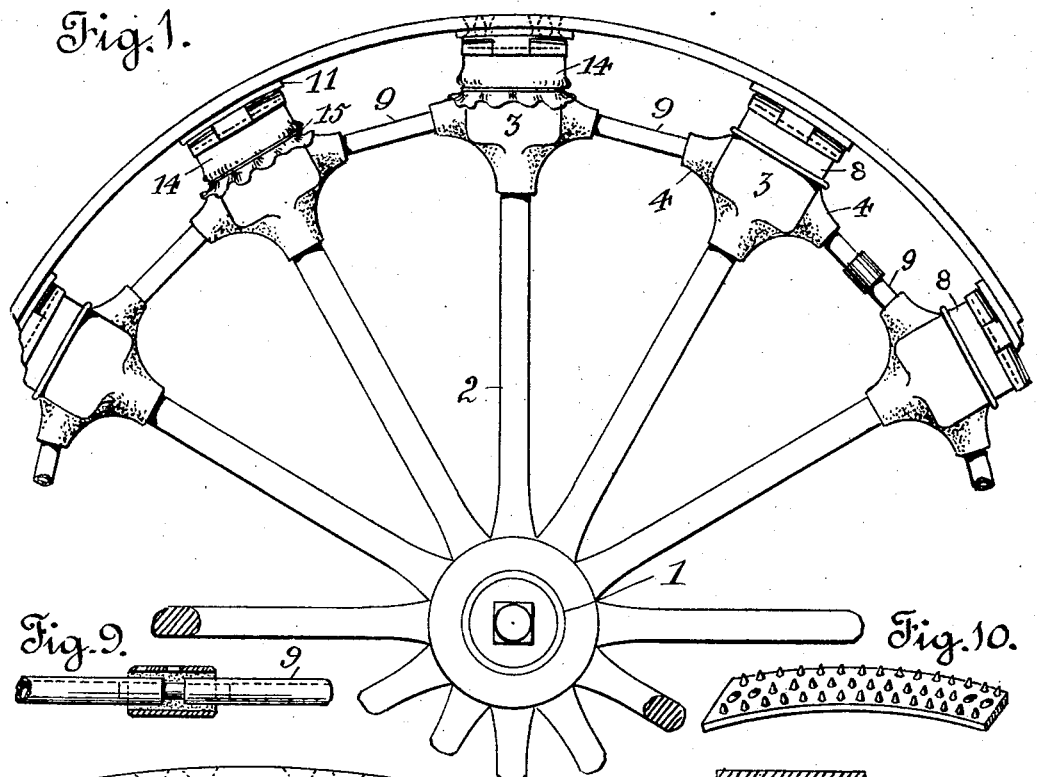
Witnesses.
H. Monteverde
M. R. Seely
Inventor.
Herman Cramer
by
Spear & Seely
Attorneys

UNITED STATES PATENT OFFICE.

HERMAN CRAMER, OF SONORA, CALIFORNIA, ASSIGNOR TO CRAMER WHEEL COMPANY, OF SAN FRANCISCO, CALIFORNIA, A CORPORATION OF CALIFORNIA.

WHEEL.

No. 865,682.           Specification of Letters Patent.           Patented Sept. 10, 1907.

Application filed February 13, 1905, Serial No. 245,476. Renewed May 21, 1907. Serial No. 374,846.

*To all whom it may concern:*

Be it known that I, HERMAN CRAMER, a citizen of the United States, residing at Sonora, in the county of Tuolumne and State of California, have invented certain new and useful Improvements in Wheels, of which the following is a specification.

My invention relates to wheels for vehicles and more particularly to those wheels which are provided with iron or steel tires.

My object is to make such vehicle wheels elastic and to accomplish the same purposes as are accomplished by a pneumatic tire. Therefore I provide at the end of each spoke an elastic connection with the tire, and I also provide for bracing the spokes together so that they shall provide one solid frame work. In this way I accomplish all the purposes of the pneumatic tire, without using such a tire, but by affording a simple mechanical construction which enables me to accomplish the object of such tires without using them.

I have shown in the accompanying drawing an embodiment of my invention in which:

Figure 1 is a side elevation of the wheel constructed in accordance with my invention. Fig. 2 is a longitudinal section showing the connection of the spoke to the rim of the wheel. Fig. 3 is an elevation of the tire and the spoke, the brace connecting the adjacent spokes being shown in section. Figs. 4 and 5 are separate plan views of two washers which are associated for the protection of the elastic filling; Figs. 6 and 7 are longitudinal sections of said washers; Fig. 8 is a similar section of said washers in association; Fig. 9 is a sectional view illustrating the connection of the last brace of the wheel. Fig. 10 is a view of the traction plate which may be applied to the iron or steel tire shown. Fig. 11 is a piece of rubber which is designed to go between the traction plate and the tire.

The hub of the wheel is shown at 1 and the spokes at 2. These spokes may be connected to the hub in any suitable way. In this case the connection is conventional, because the invention does not relate to the connection of the spokes to the hub but rather to the connection between the spokes and the rim. My object is to obtain the advantages which grow out of the use of rubber tires, without using those costly tubes of rubber which are now so commonly employed. By the use of my invention it is possible to use an iron or steel tire upon a wheel, and to so construct the wheel that the tire shall have all the elasticity of the rubber tire. Rubber tires are expensive and I have in this invention provided a cheap substitute for them. Pneumatic rubber tires are almost universally used on bicycles and automobiles, and it sometimes appears extraordinary that the fragile character of such tires has not appealed to the public notice. As their use depends upon their expansion by means of air, a single puncture may destroy their usefulness; and we know of many occasions on which an automobile or bicycle was unable to proceed simply on account of punctured tires when the operating apparatus was in complete order. My idea therefore is to use the tire of elastic steel and to combine with it elastic connections with the spokes of the wheel: and I now proceed to describe how this construction is practically carried out.

Each spoke 2 is connected to a casting 3 which has two angular hollow projections 4. The outer end of the spoke is preferably grooved as shown at 5. This end fits in the socket and is surrounded and anchored in said socket by cast metal of any suitable alloy such as babbitt poured in round it through the hole 7. The casting 3 is adapted to receive a mass of rubber which is preferably formed in one body and is shown at 8. Braces 9 extend from spoke to spoke, as chords of arcs formed by the circumference of the wheel.

To the tire of the wheel are securely riveted castings 11 having conical pins 12 which are in holes in the piece of rubber and extend down towards the spokes.

As the rubber forms the elastic medium between the tire and the vehicle it is important to protect it so far as possible: and for this purpose I have provided a hub or covering 14 of leather, which surrounds the rubber and is secured in position by a cord 15, or in any other suitable way. This protection for the rubber is further reinforced by recessed washers of sheet metal such as are shown in Figs. 4 and 5. These pieces of sheet metal overlap and their flanges cover the upper edges of the rubber and the leather just before described. One of these sheet metal pieces as shown in Fig. 7 is provided with holes by means of which it can be sewed to the leather so that the two pieces of metal are firmly secured in place. The position of these two pieces of sheet metal when joined together is shown in Fig. 8.

In setting up the wheel an outer end of the spoke is inserted into one of the castings, and a brace is connected with one of the holes in said casting. Then the body of rubber is inserted in the casting. Then the tire to which the castings 11 have been previously secured is connected successively to the spokes by causing the conical pins 12 to enter the holes in the rubber. Each spoke as soon as it has been fitted to the rim is engaged with the hub. The final part of this setting up of the wheel consists in putting in place the particular style of brace shown in Fig. 9, which must be made in two parts, secured by the sleeve and pin shown and this completes the assembly.

I do not limit myself to the construction and arrangement described herein and shown in the accompanying drawing as I desire to avail myself of all such modifications and equivalents as fall properly within the spirit of my invention.

Having described my invention, what I claim as new and desire to secure by Letters Patent, is:—

1. In a wheel, the combination with a spoke, and with the tire, of a casting in which the spoke is secured, a mass of rubber in said casting, and projecting beyond it, and a projection secured to the tire and embedded in said rubber.

2. In a wheel, the combination with the tire, of hollow castings each having a plurality of hollow projections forming sockets, a mass of rubber in the casting and loosely connected to the tire, and spokes and braces secured within the sockets in said castings.

3. In a wheel, the combination with the tire, of hollow castings each having hollow projections forming sockets, a mass of rubber in the castings in loose connection with the tire, a mass of hardened metal in each socket and spokes and braces having their ends embedded in said hardened metal.

4. In a wheel, the combination with a spoke and with the tire, of a mass of rubber interposed between said spoke and tire and having a hole or recess and a tapered pin secured to the tire and entering said recess.

5. In a vehicle wheel a hub, spokes and a tire, castings secured to the tire adjacent to each spoke, a body of rubber held by each casting and separate braces connecting said castings together, which braces are chords of arcs of the wheel.

6. In a wheel, the combination with the tire, of an intermediate structure comprising a series of independent socketed castings and separate connecting braces securing said castings together, an elastic connection between each casting and the tire, and spokes secured in said castings.

7. In a wheel, the combination with the tire and spokes, of hollow castings which receive the spokes, a mass of rubber in and projecting from each casting, and a connection between the tire and each mass of rubber, and washers or plates overlying the masses of rubber and constructed and arranged so as to admit the connection between the tire and rubber.

8. In a wheel, the combination with the tire and spokes, of hollow castings which receive the spokes, a mass of rubber in and projecting from each casting, a connection between the tire and each mass of rubber, and a pair of overlapping flanged washers or plates overlying the masses of rubber and recessed so as to admit the connection between the tire and rubber.

9. In a wheel, the combination with the tire and spokes, of hollow castings which receive the spokes, a mass of rubber in and projecting from each casting, a connection between the tire and each mass of rubber, a piece of leather covering the projecting part of the rubber and secured to each casting, and washers or projecting plates overlying the leather and secured to said leather.

10. A fellyless wheel comprising a hub, spokes and tire, a structure comprising castings having means for receiving the spokes and connected by straight braces which are chords of arcs formed by the tire, a mass of rubber in and projecting beyond each casting, and pins projecting from the tire and embedded in said masses of rubber.

In testimony whereof I have affixed my signature, in presence of two witnesses, this 6th day of January 1905.

HERMAN CRAMER.

Witnesses:
M. R. SEELY,
CELESTE ANSELL.